(12) United States Patent
Saitou

(10) Patent No.: US 10,890,894 B2
(45) Date of Patent: Jan. 12, 2021

(54) NUMERICAL CONTROLLER AND MISINPUT DETECTING METHOD

(71) Applicant: Fanuc Corporation, Yamanashi (JP)

(72) Inventor: Kiwamu Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 34 days.

(21) Appl. No.: 16/433,125

(22) Filed: Jun. 6, 2019

(65) Prior Publication Data
US 2019/0384262 A1    Dec. 19, 2019

(30) Foreign Application Priority Data

Jun. 19, 2018   (JP) ................................. 2018-116400

(51) Int. Cl.
*G05B 19/4155*    (2006.01)
*G05B 19/404*    (2006.01)

(52) U.S. Cl.
CPC ....... *G05B 19/4155* (2013.01); *G05B 19/404* (2013.01)

(58) Field of Classification Search
None
See application file for complete search history.

(56) References Cited

FOREIGN PATENT DOCUMENTS

| JP | 2005-128851 A | 5/2005 |
|---|---|---|
| JP | 2006163665 A | 6/2006 |

OTHER PUBLICATIONS

Notice of Reasons for Refusal for Japanese Application No. 2018-116400, dated Aug. 18, 2020, with translation, 6 pages.

*Primary Examiner* — Carlos R Ortiz Rodriguez
(74) *Attorney, Agent, or Firm* — RatnerPrestia

(57) ABSTRACT

A numerical controller is provided with a machining program input unit configured to receive as an input (i) a machining program and (ii) information on at least two of items including a machining method, a machining shape, and a use tool, corresponding to the machining program, and a machining content verification unit configured to detect inconsistency of a combination of at least two of the items including the machining method, the machining shape, and the use tool, based on a predetermined criterion for determination.

4 Claims, 8 Drawing Sheets

FIG. 8

| MACHINING SHAPE/USE TOOL | DIMENSIONS READ FROM MACHINING SHAPE | DIMENSIONS READ FROM USE TOOL | CRITERIA FOR INTEGRITY DETERMINATION (CONSISTENT) |
|---|---|---|---|
| CIRCULAR HOLE/DRILL | HOLE DIAMETER | TOOL DIAMETER | HOLE DIAMETER ≧ TOOL DIAMETER |
| CIRCULAR HOLE/DRILL | HOLE DEPTH | TOOL LENGTH | HOLE DEPTH ≦ TOOL LENGTH |
| THREADED HOLE/TAP | THREAD PITCH | TAP PITCH | THREAD PITCH = TAP PITCH |
| THREADED HOLE/TAP | SCREW DIAMETER | TAP DIAMETER | SCREW DIAMETER = TAP DIAMETER |

NUMERICAL CONTROLLER AND MISINPUT DETECTING METHOD

RELATED APPLICATIONS

The present application claims priority to Japanese Patent Application Number 2018-116400 Jun. 19, 2013, the disclosure of which is hereby incorporated by reference herein in its entirety.

BACKGROUND OF THE INVENTION

Field of the Invention

The present invention relates to a misinput detection technique, and more particularly, to a numerical controller and a misinput detecting method capable of detecting misinput.

Description of the Related Art

At a machining site where an industrial machine such as a machine tool is used, a machining program may sometimes be corrected on a manipulator of a numerical controller in order to meet needs there. If a numerical value or tool number is wrongly input as this is done, machining failure, machinery breakdown, or the like will be caused.

A method for detecting misinput is disclosed in, for example, Japanese Patent Application Laid-Open No. 2005-128851. In the method described in Japanese Patent Application Laid-Open No. 2005-128851, machining patterns based on appropriate combinations of the way of tool movement and machining conditions are previously defined for each machining shape, and a machining program is created by combining these machining patterns, thereby preventing the occurrence of inconsistency in the machining program.

According to the technique described in Japanese Patent Application Laid-Open No. 2005-128851, however, although the occurrence of inconsistency can be prevented during the creation of the machining program, it cannot be detected whether or not inconsistency is caused when the created machining program is corrected ex post facto at the machining site or the like. This is because conventional machining programs created using G-codes and the like include information on machining methods only and lack in information to detect caused inconsistency.

SUMMARY OF THE INVENTION

The present invention has been made to solve the above problem and has an object to provide a numerical controller and a misinput detecting method capable of detecting misinput.

A numerical controller according to one aspect of the present invention is a numerical controller capable of handling at least two of pieces of information including a machining method, a machining shape, and a use tool, and comprises a machining program input unit configured to receive as an input (i) a machining program and (ii) information on at least two of the items including the machining method, the machining shape, and the use tool, corresponding to the machining program, and a machining content verification unit configured to detect inconsistency of a combination of at least two of the items including the machining method, the machining shape, and the use tool, based on a predetermined criterion for determination.

The machining content verification unit may be configured to execute output of a warning, presentation of a correction candidate, or automatic correction if the inconsistency is detected.

A misinput detecting method according to another aspect of the present invention is a method for detecting misinput in a machining program by using at least two of pieces of information including a machining method, a machining shape, and a use tool, and comprises a step in which a machining program input unit receives as an input (i) the machining program and (ii) information on at least two of the items including the machining method, the machining shape, and the use tool, corresponding to the machining program, and a step in which the machining content verification unit detects inconsistency of a combination of at least two of the items including the machining method, the machining shape, and the use tool, based on a predetermined criterion for determination.

The machining content verification unit may execute output of a warning, presentation of a correction candidate, or automatic correction if the inconsistency is detected.

According to the present invention, there can be provided a numerical controller and a misinput detecting method capable of detecting misinput.

BRIEF DESCRIPTION OF THE DRAWINGS

FIG. 8 is a diagram showing examples of dimensions to be read and criteria for determination of integrity.

DETAILED DESCRIPTION OF THE PREFERRED EMBODIMENTS

There are known a machining program, including information such as a machining shape, machining method, and use tool, and a numerical controller capable of handling the machining program. The numerical controller of this type is particularly called an integrated CNC system.

A numerical controller 1 according to an embodiment of the present invention is the integrated CNC system that handles the machining program including the information such as the machining shape, machining method, and use tool. The machining program mentioned in the present embodiment is the one that includes the information such as the machining shape, machining method, and use tool unless otherwise specified.

The information indicative of the machining shape, machining method, and use tool is described in the machining program handled in the present embodiment. Therefore, if an inappropriate machining method or use tool is selected in generating a target machining shape, the numerical controller 1 can point out the possibility of misinput.

Figure 1:
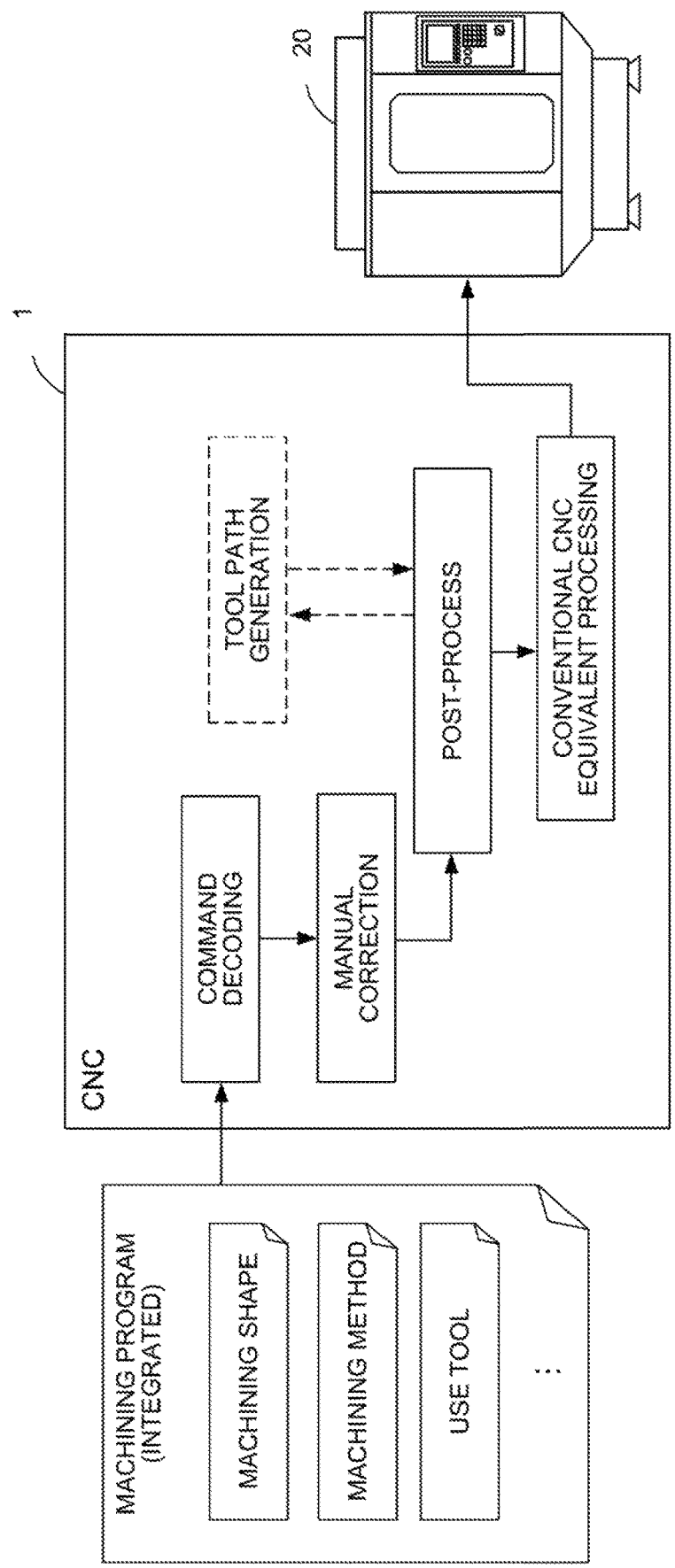
FIG. 1 is a diagram illustrating an outline of processing performed by a numerical controller according to an embodiment of the present invention.

An outline of processing performed by the numerical controller 1 will be described with reference to the schematic diagram of FIG. 1.

The numerical controller 1 reads and decodes the machining program in which the information on the machining shape, machining method, and use tool is described and generates a machining path based on the machining program. If the machining program is then edited by an operator, the numerical controller 1 verifies the integrity of the machining program (i.e., consistency of correlations between the machining shape, machining method, and use tool) as a post-process. Finally, the numerical controller 1, like a conventional numerical controller, performs axis control to execute machining.

Figure 2:
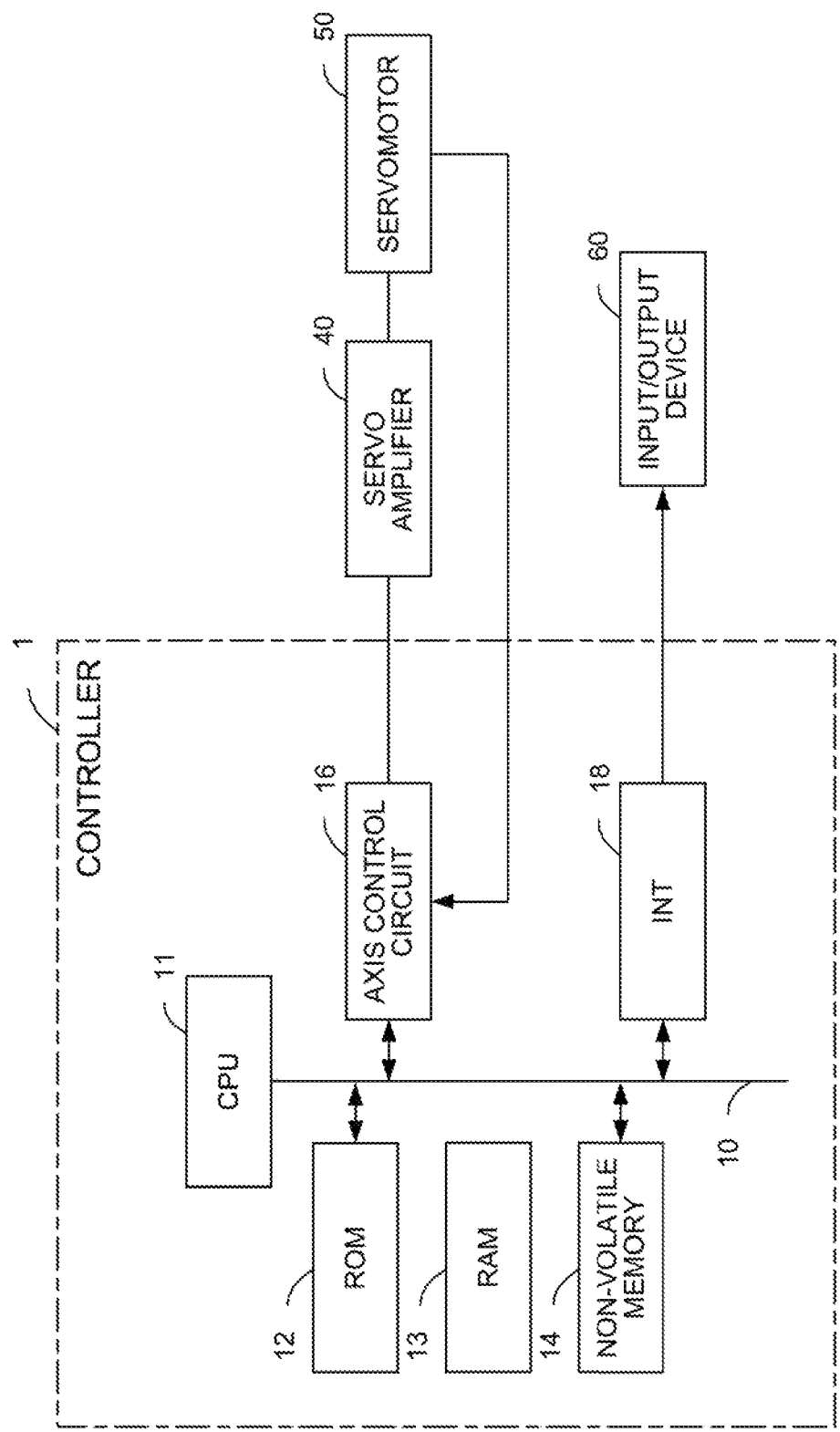
FIG. 2 is a diagram showing a hardware configuration of the numerical controller of FIG. 1.

FIG. 2 is a schematic hardware configuration diagram showing principal parts of the numerical controller 1.

The numerical controller 1 is a device for controlling a machine tool 20. The numerical controller 1 comprises a CPU 11, ROM 12, RAM 13, non-volatile memory 14, interface 18, bus 10, and axis control circuit 16. The numerical controller 1 is connected with a servo amplifier 40, servomotor 50, and input/output device 60.

The CPU 11, which is a processor for generally controlling the numerical controller 1, reads out a system program stored in the ROM 12 via the bus 10 and controls the entire numerical controller 1 according to the system program.

The ROM 12 is previously loaded with system programs for executing various controls of the machine tool. The RAM 13 is temporarily loaded with temporary calculation data and display data, various data and programs input by the operator through an input/output device 60 (described later), and the like.

The non-volatile memory 14 is backed up by, for example, a battery (not shown) so that its storage state can be maintained even when the numerical controller 1 is switched off. The non-volatile memory 14 stores data, programs, and the like input through the input/output device 60. The programs and data stored in the non-volatile memory 14 may be developed in the RAM 13 during execution and use.

The axis control circuit 16 controls the motion axes of the machine tool 20. The axis control circuit 16 receives a movement command amount for each axis output by the CPU 11 and outputs a movement command for the axis to the servo amplifier 40.

On receiving the axis movement command output by the axis control circuit 16, the servo amplifier 40 drives the servomotor 50. The servomotor 50 is driven by the servo amplifier 40 to move the motion axes of the machine tool. The servomotor 50 typically has a position/speed detector built-in. The position/speed detector outputs a position/speed feedback signal, and position/speed feedback control is performed as this signal is fed back to the axis control circuit 16.

In FIG. 2, the axis control circuit 16, servo amplifier 40, and servomotor 50 are each shown as being only one in number. Actually, however, these elements are provided corresponding in number to the axes of the machine tool 20 to be controlled. If the controlled machine tool 20 has three axes, for example, three sets, in total, of the axis control circuit 16, servo amplifier 40, and servomotor 50 are provided corresponding individually to the axes.

The input/output device 60 is a data input/output device equipped with a display, hardware keys, and the like, and is typically a control panel. The input/output device 60 displays information received from the CPU 11 through the interface 18 on the display. The input/output device 60 delivers commands and data input from the hardware keys and the like to the CPU 11 through the interface 18. According to the input/output device 60, the programs stored in the non-volatile memory 14 can be displayed on the display and edited by means of the hardware keys, for example.

Figure 3:
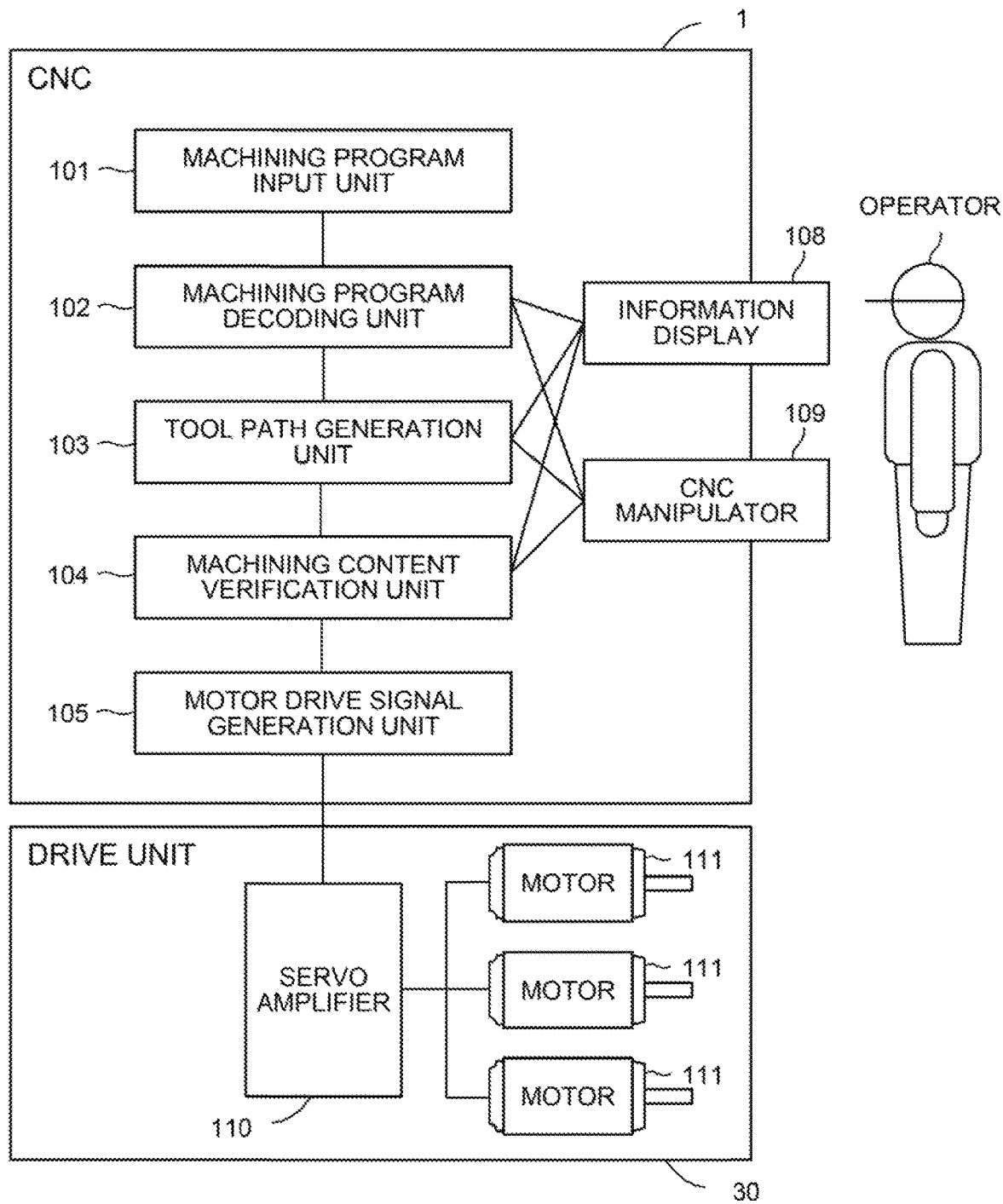
FIG. 3 is diagram showing a functional configuration of the numerical controller of FIG. 2.

FIG. 3 is a block diagram showing a schematic functional configuration of the numerical controller 1 capable of detecting misinput.

The numerical controller 1 comprises a machining program input unit 101, machining program decoding unit 102, tool path generation unit 103, machining content verification unit 104, motor drive signal generation unit 105, information display 108, and CNC manipulator 109. Moreover, the numerical controller 1 is connected with a drive unit 30 of the machine tool 20 comprising a servo amplifier 110 and motors 111.

The machining program input unit 101 externally reads machining programs created in advance and loads them into the RAM 13 and the non-volatile memory 14, and moreover, loads a machining program edited by the operator using the input/output device 60 and the like into the RAM 13 and the non-volatile memory 14. The details of the machining programs handled in the present embodiment will be described later.

The machining program decoding unit 102 interprets the machining program acquired by the machining program input unit 101.

The tool path generation unit 103 generates a tool path based on the result of the interpretation of the machining program by the machining program decoding unit 102.

The machining content verification unit 104 verifies whether or not the machining program acquired by the machining program input unit 101 is inconsistent.

The motor drive signal generation unit 105, which is equivalent to the foregoing axis control circuit 16 (shown in FIG. 2), generates a motor drive signal for moving a tool along the tool path generated by the tool path generation unit 103.

The information display 108 displays the machining program read by the machining program input unit 101, various messages output by the machining content verification unit 104, and the like on the display of the input/output device 60.

The CNC manipulator 109 is a device that provides an interface for inputting editing of the machining program, manual operation of the machine tool 20, and the like. For example, a conventional device integrated with the numerical controller 1, or a conventional device of pendant type, remote-control type, or the like can be employed as the CNC manipulator 109.

The servo amplifier 110, which is equivalent to the foregoing servo amplifier 40 (shown in FIG. 2), receives the motor drive signal output by the motor drive signal generation unit 105 and drives the motors 111.

The motors 111, which are equivalent to the foregoing servomotor 50 (shown in FIG. 2), are driven by the servo amplifier 110 to move the motion axes of the machine tool 20.

The following is a description of the machining program handled by the numerical controller 1.

The machining program input unit 101 of the numerical controller 1 should preferably receive as an input the machining program described in association with the information on the machining shape, machining method, and use tool. This method will mainly be dealt with in the present embodiment. However, the entire information on the machining shape, machining method, and use tool need not be input from a single file. For example, such a method may be devised that the machining method is described in the machining program, the machining shape is given as a CAD file, the tool information is previously registered in the numerical controller 1, and the numerical controller 1 associates these pieces of information with one another using the feature ID of the CAD file, use tool number, and the like. Moreover, all the pieces of information on the machining shape, machining method, and use tool need not be completely prepared and it is necessary only that at least two of these pieces of information be prepared.

The following is a description of an example of a suitable information structure for the case where the information on the machining shape, machining method, and use tool is input as a single file or machining program.

Information required for control of a machine tool is described in the machining program according to a predetermined form or data model. Examples of known data models include ISO 14649 and APT format. However, the structure of the machining program can be arbitrarily selected without being restricted to these known data models only if it allows a description of necessary information.

In the present embodiment, the data model includes the following pieces of information. Typically, these pieces of information are described as having a layered structure and related pieces of information are associated with one another.

(1) Information on Machining Method

For example, the following pieces of information are related to the machining method (all these pieces of information need not be related, however):

a type of the machining method (information indicative of, e.g., drilling, bottom milling, or side milling);

a more detailed machining strategy according to the machining type (e.g., information indicative of the depths of axial and radial cuts and the path (parallel or spiral) in the case of the bottom milling);

a spindle speed;

a feed rate or cutting amount per cutting edge;

a tool path; and other pieces of information required to identify the machining method (e.g., cutting start and end points).

(2) Information on Cutting Shape

For example, the following pieces of information are related to the machining shape (all these pieces of information need not be related, however):

a type of the machining shape (information indicative of, e.g., a circular hole, flat surface, pocket, free curved surface, or threaded hole); and various dimensions required to identify the shape (e.g., center coordinates, hole direction, diameter, and depth in the case of the circular hole and angles and tolerances of individual dimensions in the case of a cone-shaped bottom).

(3) Information on Use Tool

For example, the following pieces of information are related to the use tool (all these pieces of information need not be related, however):

a type of the tool (information indicative of, e.g., a drill, end mill, face mill, or tapping tool);

various dimensions (e.g., diameter, effective cutting length, and corner R in the case of the end mill);

3D shape information of the tool; and a tool model number.

Figure 4:
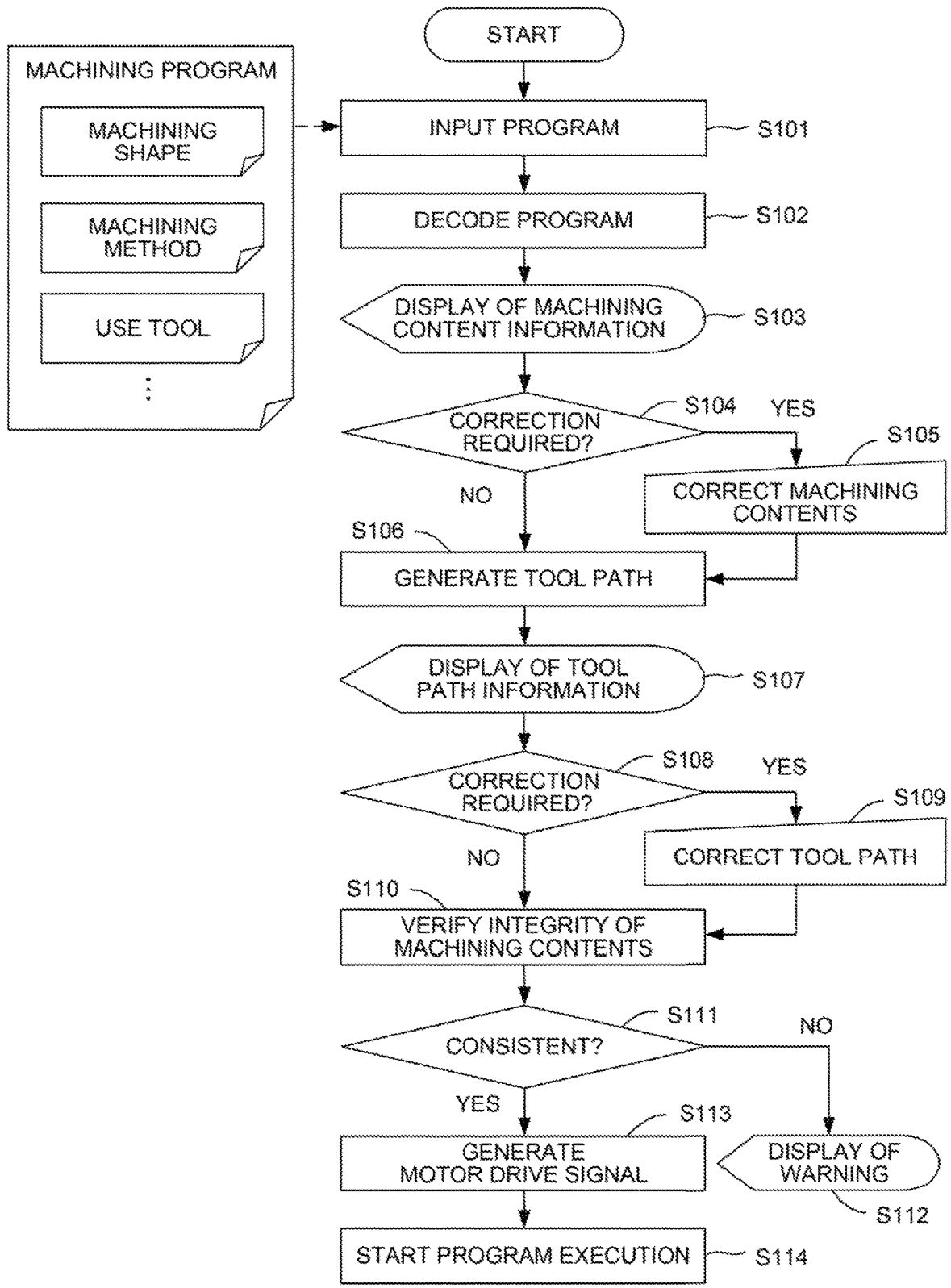
FIG. 4 is a flowchart showing the operation of the numerical controller of FIG. 3.
Figure 5:
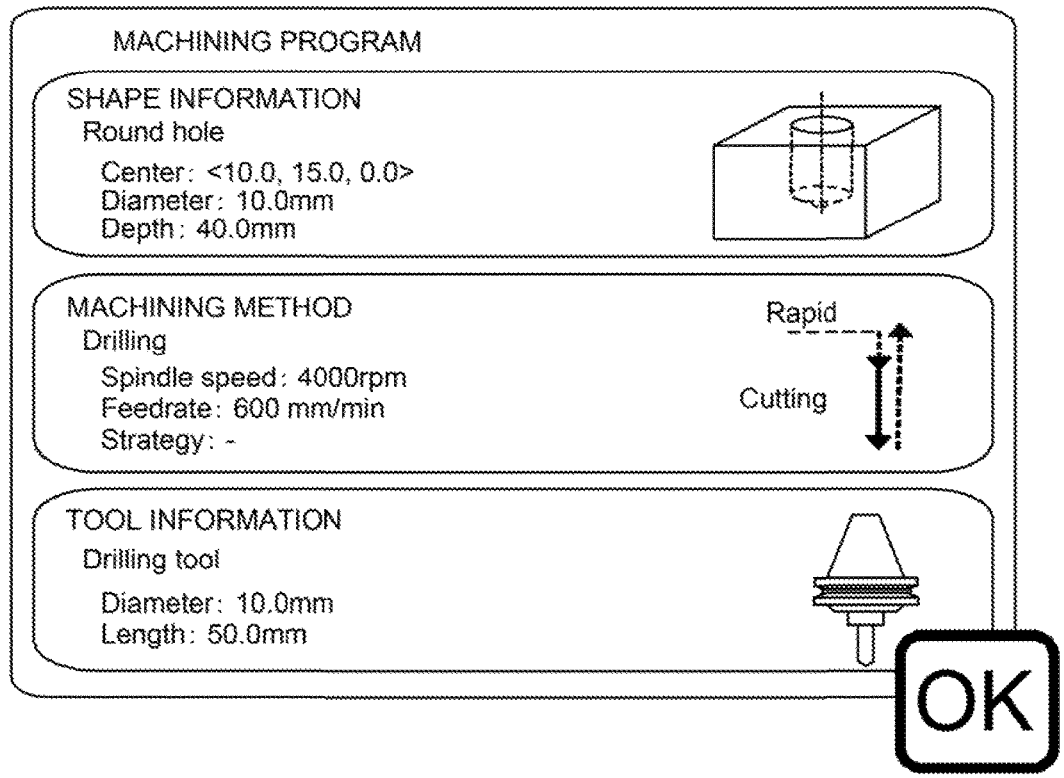
FIG. 5 is a diagram showing an example of machining content integrity verification processing.

The operation of the numerical controller 1 capable of detecting misinput will be described with reference to the flowchart of FIG. 4.

This processing verifies the contents of the externally input machining programs and the machining program manually corrected thereafter by the operator using the input/output device 60 or the like and outputs an alarm if there is an actually-improbable combination of the machining shape, machining method, and use tool that are used in the machining programs.

Step S101: The machining program input unit 101 reads the machining program described in association with the information on the machining shape, machining method, and use tool.

Step S102: The machining program decoding unit 102 decodes the machining program and converts it to machining content information in which the machining shape, machining method, and use tool are put together for each machining process. The machining process implies one or more processes that constitute machining performed according to the machining program. For example, a program for boring a threaded hole includes machining processes as follows: (1) a process of machining a flat surface in which the threaded hole is to be bored; (2) a process of drilling; (3) a process of chamfering the edge of the hole; and (4) a process of tapping.

Step S103: The information display 108 displays to the operator the machining content information.

Steps S104 and S105: The operator observes the machining content information displayed on the information display 108 and corrects it by means of the CNC manipulator 109 as required.

Step S106: If the machining program does not include tool path information or if a correction of the machining content information that requires a change of the tool path is made by the operator, the tool path generation unit 103 calculates the tool path based on the machining content information. Moreover, the created tool path is associated with the machining content information.

Step S107: The information display 108 displays to the operator the tool path read from the machining program or created by the tool path generation unit 103.

Steps S108 and S109: The operator observes the tool path displayed on the information display 108 and corrects it by means of the CNC manipulator 109 as required.

Step S110: The machining content verification unit 104 verifies the machining content information to see if the relationship between at least two of the pieces of information including the machining shape, machining method, and use tool is inconsistent. A specific method for verification will be described later.

Step S112: If inconsistency is found, the machining content verification unit 104 displays a warning on the information display 106.

Moreover, if correction candidates of the machining content information are presentable, the machine position error correction unit 104 displays them on the information display 108. When the operator selects an intended one of the correction candidates by using the CNC manipulator 109, the machining content verification unit 104 causes the selected content of correction to be reflected in the machining content information. If the selected content of correction requires a change of the tool path, the tool path generation unit 103 generates the tool path again.

Step S113: The motor drive signal generation unit 105 generates the motor drive signal based on the machining content information that is confirmed to be consistent and sends it to the drive unit of the machine tool 20. The servo amplifier 110 of the drive unit drives the motors 111 according to the motor drive signal.

Integrity verification processing for the machining content information by the machining content verification unit 104 will be specifically described using the examples shown in FIGS. 5 to 9.

The machining content verification unit 104 is assumed to be previously holding the following pieces of information:

a list of machining method types usable for machining of each machining shape type;

a list of tool types usable for machining of each machining shape type; and a list of tool types usable for each machining method type.

First, the machining content verification unit 104 reads the machining shape type, machining method type, and use tool type from the machining content information and performs the following determination. If any one of the types including the machining shape type, machining method type, and use tool type is determined to be inconsistent, the machining content verification unit 104 determines the machining content information to be inconsistent and gives the operator a warning to that effect (as in the examples of FIGS. 6 to 9). In other cases, the machining content information is assumed to be consistent and machining is performed (as in the example of FIG. 5).

The list of the machining method types usable for the read machining shape type and the read machining method type are compared with each other. If the read machining method type is not included in the list, it is determined to be inconsistent.

In the case where the correction candidates are displayed, the list of the machining method types usable for the read machining shape type is displayed so that the operator can be made to select an arbitrary machining method type, for example.

The list of the tool types usable for the read machining shape type and the read use tool type are compared. If the read use tool type is not included in the list, it is determined to be inconsistent.

Figure 7:
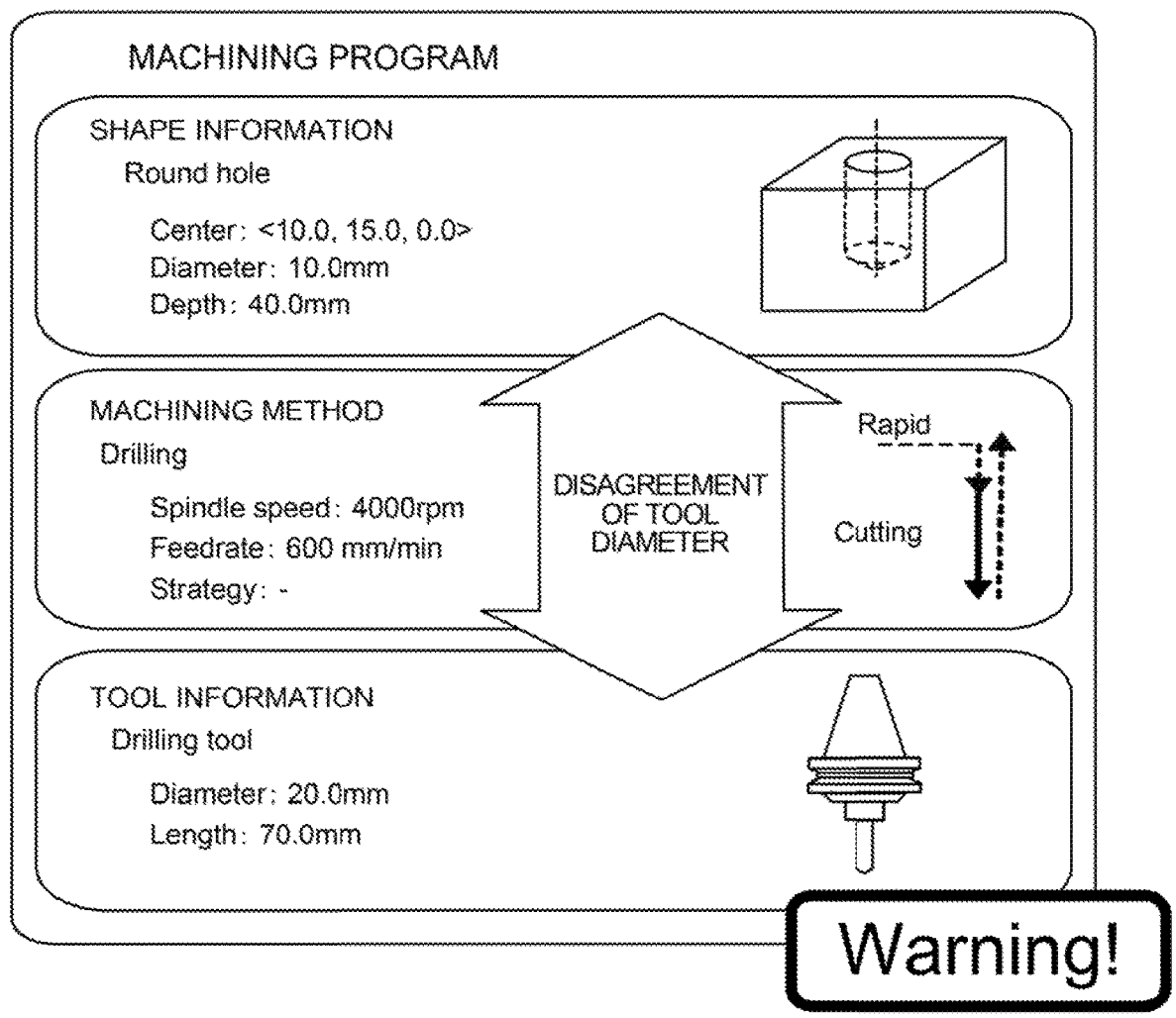
FIG. 7 is a diagram showing an example of the machining content integrity verification processing.

This is the case of the example shown in FIG. 7. If a tool type "Drilling tool" is not included in the list of the tool types usable for a machining shape type "Round hole", it is determined to be inconsistent.

In the case where the correction candidates are displayed, the list of the use tool types usable for the read machining shape type is displayed so that the operator can be made to select an arbitrary use tool type, for example.

The list of the tool types usable for the read machining method type and the read use tool type are compared. If the read use tool type is not included in the list, it is determined to be inconsistent.

Figure 6:
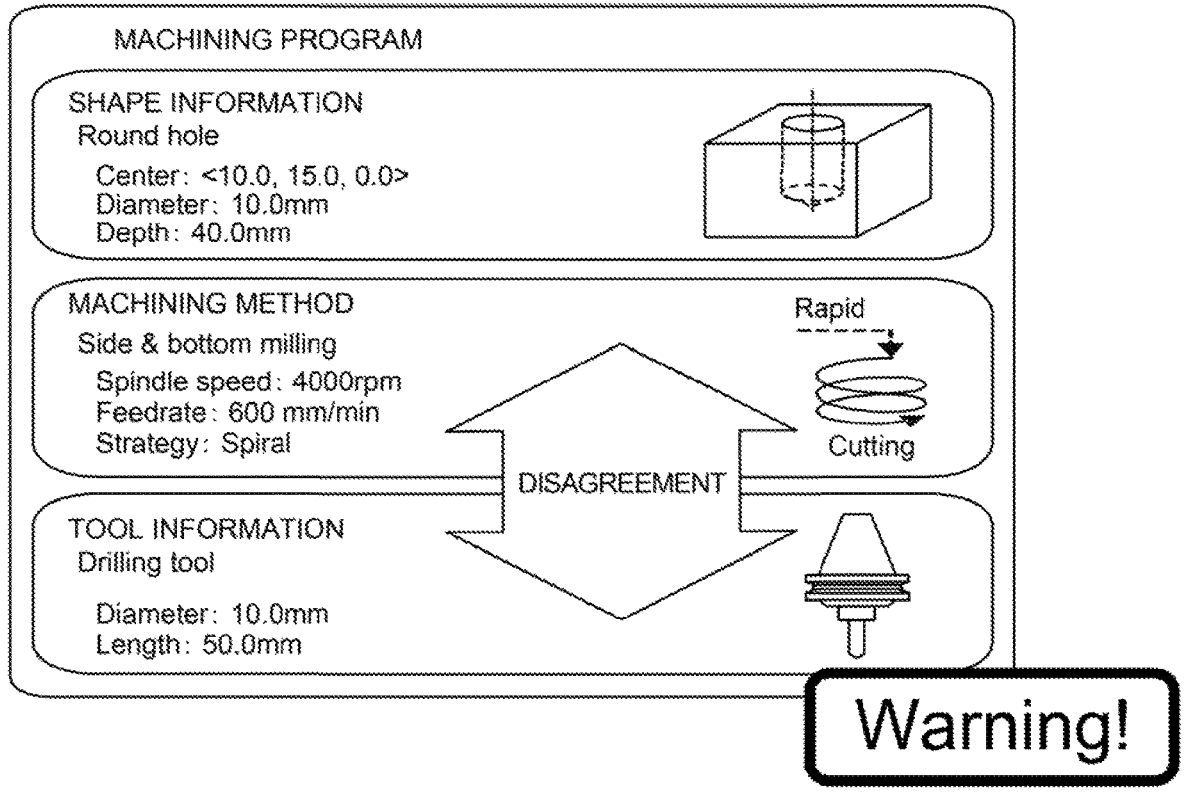
FIG. 6 is a diagram showing an example of the machining content integrity verification processing.

This is the case of the example of FIG. 6. If the tool type "Drilling tool" is not included in the list of the tool types usable for a machining method type "Side & bottom milling", it is determined to be inconsistent.

In the case where the correction candidates are displayed, the list of the use tool types usable for the read machining method type is displayed so that the operator can be made to select an arbitrary use tool type, for example.

The integrity can be verified by reading and comparing the dimensions of the machining shape and the use tool. The dimensions to be read and the criteria for determination of the integrity vary depending on the machining shape type and the use tool type. FIG. 8 shows examples of the dimensions to be read and the criteria for determination of the integrity.

The dimensions of the machining shape and the use tool and the tool path are read and are determined to be inconsistent if a cutting range calculated from the tool dimensions and the tool path is deviated from the machining shape.

Figure 9:
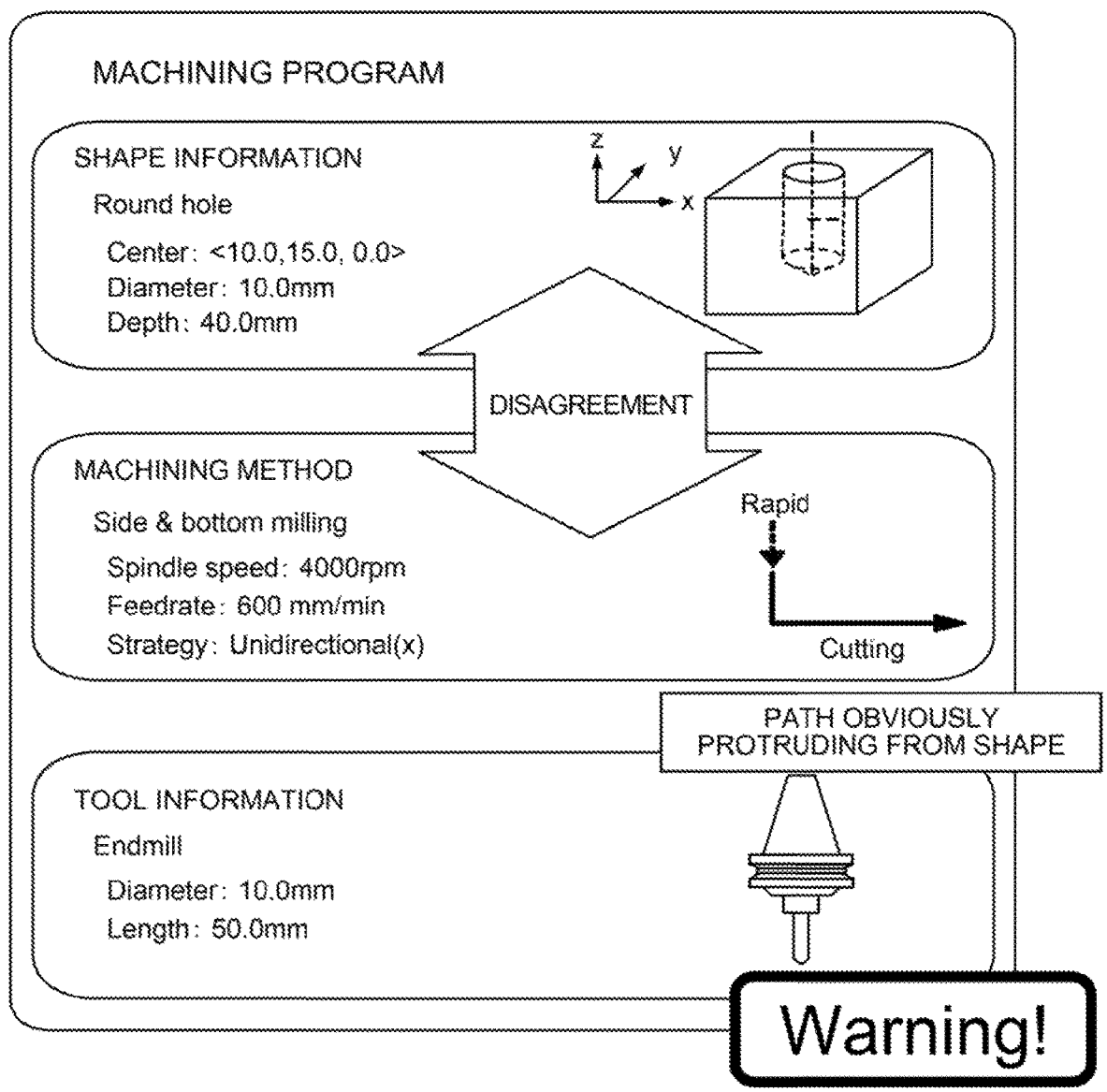
FIG. 9 is a diagram showing an example of the machining content integrity verification processing.

This is the case of the example of FIG. 9. If the cutting range calculated from the tool dimensions and the tool path is deviated from the machining shape, such a case is determined to be inconsistent.

According to the present embodiment, the numerical controller 1 that uses the machining program including the information on the machining shape, machining method, and use tool verifies whether or not the relationship between these pieces of information is inconsistent according to its own criteria for determination. In this way, integrity can be maintained by checking on the numerical controller 1 even when the machining program is corrected in a post-process, so that machining failure and collision due to wrong correction can be prevented in advance.

While an embodiment of the present invention has been described herein, the invention is not limited to the above embodiment and may be suitably modified and embodied in various forms. For example, the numerical controller 1 of the above-described embodiment performs the integrity check when the machining program and the tool path are edited on it. However, the present invention is not limited to this and an externally input (unedited) machining program can also be checked for integrity, for example.

Moreover, according to the above embodiment, the present invention is mainly applied to the numerical controller 1. However, the present invention is not limited to this and, for example, the same processing as in the above embodiment can be performed by means of an arbitrary information processor capable of handling machining programs, e.g., a machine tool or an information processor connected to the numerical controller 1.

The invention claimed is:

1. A numerical controller capable of handling at least two of
    pieces of information including a machining method, a machining shape, and a use tool, the numerical controller comprising:
        a machining program input unit configured to receive as an input (i) a machining program and (ii) information on at least two of the items including the machining method, the machining shape, and the use tool, corresponding to the machining program; and
        a machining content verification unit configured to detect inconsistency of a combination of at least two of the items including the machining method, the machining shape, and the use tool, based on a predetermined criterion for determination.

2. The numerical controller according to claim 1, wherein the machining content verification unit is configured to execute output of a warning, presentation of a correction candidate, or automatic correction if the inconsistency is detected.

3. A method for detecting misinput in a machining program by using at least two of pieces of information including a machining method, a machining shape, and a use tool, the method comprising:
    a step in which a machining program input unit receives as an input (i) the machining program and (ii) information on at least two of the items including the machining method, the machining shape, and the use tool, corresponding to the machining program; and a step in which the machining content verification unit detects inconsistency of a combination of at least two of the items including the machining method, the machining shape, and the use tool, based on a predetermined criterion for determination.

4. The misinput detecting method according to claim 3, wherein the machining content verification unit executes output of a warning, presentation of a correction candidate, or automatic correction if the inconsistency is detected.

* * * * *